UNITED STATES PATENT OFFICE.

HELEN L. MACKER, OF BOSTON, MASSACHUSETTS.

IMPROVEMENT IN ALLOYS FOR BELL-METAL.

Specification forming part of Letters Patent No. 169,648, dated November 9, 1875; application filed September 6, 1875.

*To all whom it may concern:*

Be it known that I, HELEN L. MACKER, of Boston, in the county of Suffolk and State of Massachusetts, have invented certain new and useful Improvements in Bell-Metals; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to an improved composition for bell-metals; and consists of the following metals, viz: Copper, iron, zinc, and nickel, in about the following quantities, viz: Twelve pounds of copper, five pounds of iron, three pounds of zinc, and one half pound of nickel.

To prepare my improved composition I melt the copper and nickel together, I then add the iron, and, finally, after cooling a few moments, I add the zinc.

I am aware that copper, iron, zinc, and nickel have heretofore been combined together to form an alloy, and I therefore wish to state that I do not claim as my invention broadly the combination of the above-named four metals.

Bells made from this my improved composition are very durable, have beautiful and harmonious tones, are not liable to crack with violent ringing, or by exposure to different variations in the temperature, and weigh less than bells made from ordinary bell-metal.

What I wish to secure by Letters Patent, and claim, is—

The herein-described improved alloy, consisting of copper, iron, zinc, and nickel in the proportions specified, as and for the purpose set forth.

In testimony that I claim the foregoing as my own invention, I have affixed my signature in presence of two witnesses.

HELEN L. MACKER.

Witnesses:
ALBAN ANDRÉN,
F. ALLEN.